Nov. 25, 1941.  F. SCHREYER  2,263,650
TRAP
Filed Oct. 24, 1940  2 Sheets-Sheet 1

Inventor
Frederick Schreyer
By Clarence A. O'Brien
Attorney

Nov. 25, 1941.   F. SCHREYER   2,263,650
TRAP
Filed Oct. 24, 1940   2 Sheets—Sheet 2
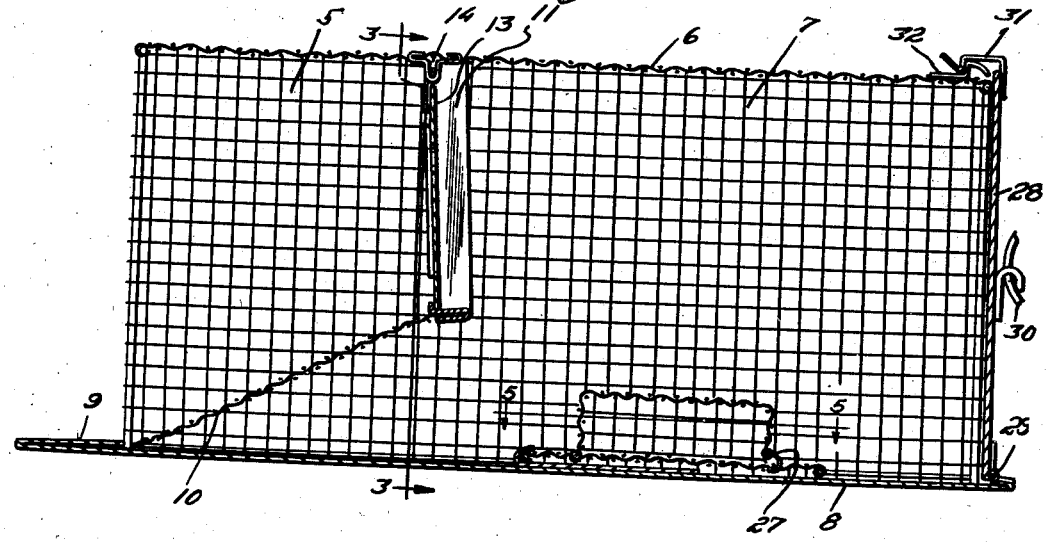
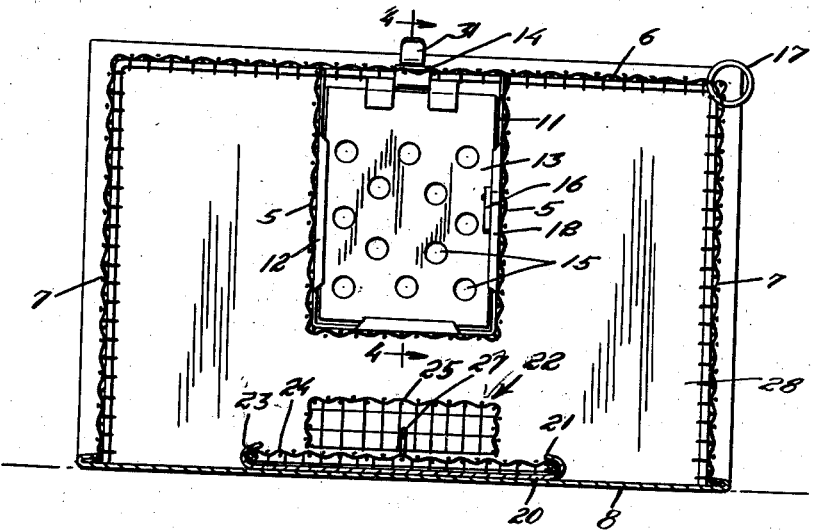
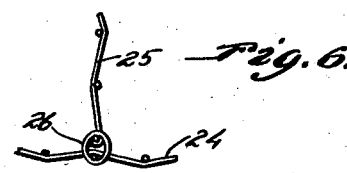
Inventor
Frederick Schreyer
By *Clarence A. O'Brien*
Attorney Patented Nov. 25, 1941

2,263,650

UNITED STATES PATENT OFFICE 2,263,650

TRAP

Frederick Schreyer, Jamaica, N. Y., assignor of forty-nine per cent to William Bicknese, Jamaica, N. Y.

Application October 24, 1940, Serial No. 362,679

2 Claims. (Cl. 43—66)

The present invention constitutes a continuation in part of the subject matter of my copending application Serial No. 226,360, filed August 23, 1938.

The invention relates to traps which without modification, are adaptable to catching fish, animals and various game capable of being trapped.

An important object of the present invention is to provide a trap which can be used in tidewater without likelihood of the same becoming clogged by seaweed or debris.

Another important object of the invention is to provide a trap having a special entrance which will have a degree of enticement to animals or other creatures which approach the same.

Still another important object of the invention is to provide a trap in which bait can be placed and protected against consumption by a trapped creature.

Still another important object of the invention is to provide means whereby the trap can be readily carried even with a creature trapped therein.

These and numerous other important objects and advantages of the invention will become apparent to the reader of the following specification.

In the drawings:

Figure 2 is a longitudinal sectional view through the trap.

Figure 3 is a transverse sectional view taken substantially on a line 3—3 of Figure 2.

Figure 6 is a fragmentary sectional view showing the manner in which the bait box is hinged.

Figure 1:
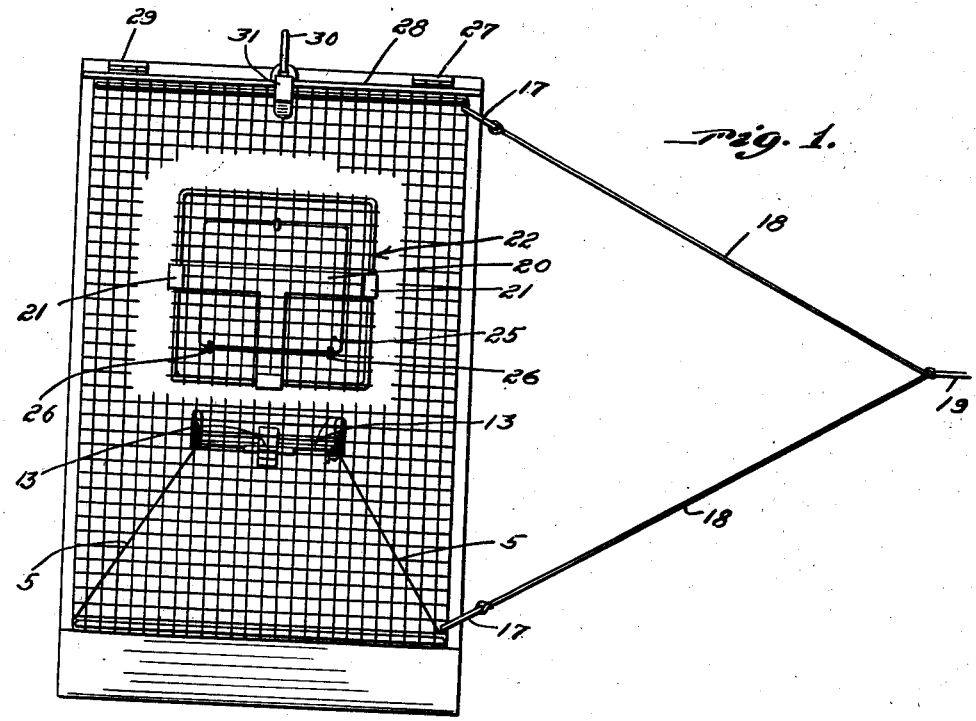
Figure 1 represents a top plan view of the trap with a portion broken away to disclose the bait box.

Referring to the drawings wherein like numerals designate like parts, it can be seen that the trap has its entrance walls, side walls and top wall constructed of foraminous material, these walls being denoted respectively, by numerals 5, 6, and 7. The trap has a bottom wall 8 of sheet metal, the forward end of which is bent backwardly as at 9 upon itself and against the forward end of an inclined walk-way 10, also of foraminous material which leads upwardly to a door frame 11 set well back into the trap. To the side portions of this door frame 11 also lead the converging entrance walls 5 as clearly shown in Figures 1 and 2.

Figures 4, 5:
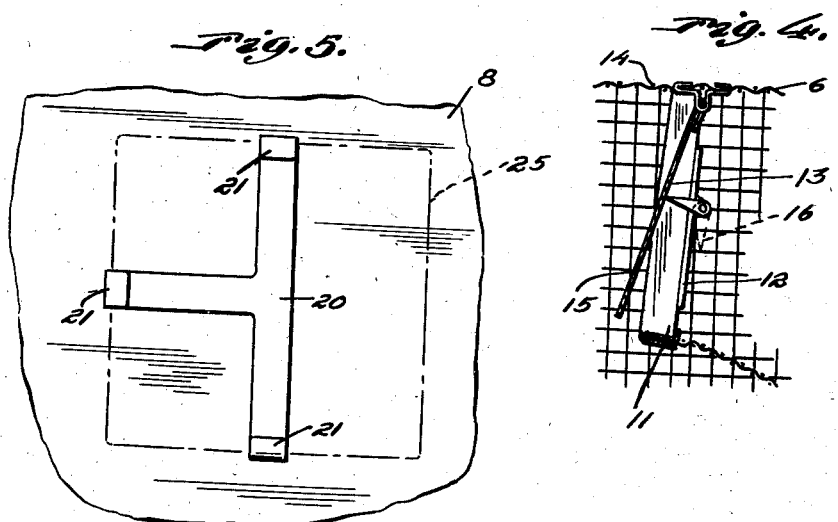
Figure 4 is a fragmentary detailed sectional view showing the doorway and door set in slightly opened position.
Figure 5 is a fragmentary top plan view of the trap bottom showing the bait box holding means.

As suggested in Figures 2 and 4, the door frame 11 is set in a slightly inclined position and has flanges 12 at the vertical edges and bottom thereof, these flanges serving as abutments for a door 13 which is swingably connected at its upper end as at 14 to the top 6 of the trap. This door 13 is preferably constructed of aluminum and has openings 15 therein.

A swingable and pointed pawl 16 is mounted on the forward edge of the door frame 11 and can be elevated to a horizontal position as shown in Figure 4 to bear against and hold slightly ajar the door 13. The door 13 may be held in this position in still water, but preferably on land, the open position of the door serving as an encouragement to animals to further push open the door and enter. Of course, as soon as the animal passes into the captivating chamber of the trap, the door 13 slams shut, following the drop of the pawl 16 to the dotted line position shown in Figure 4. The door frame 11 being slightly inclined from a bottom point forwardly permits the door to fully close and maintain a snug contact against the flanges 12.

As can be seen in Figure 4, the door frame 11 is substantially wide in a front and rear direction and this serves a purpose in that when the trap is used in tide water any movement of the tide will have no effect on the door 13. When the trap is used in tide water the pawl 16 is not utilized. The trap in tide water is always set with the door 13 transversely in alinement with the direction of flow of the tide, to the end that the tide flow will be deflected by the door frame 11 and will have no tendency under any circumstances to deflect the door 13 to an open postion.

As shown in Figure 1, front and rear corners of the trap are provided with rings 17 to which lines 18 may be connected and these join an anchoring line 19 which extends in the same direction as the movement of the tide.

In the captivating chamber of the trap and upon the sheet metal bottom 8 is a T-shaped bait box retainer 20 having inturned lugs 21 at the ends thereof. Numeral 22 generally refers to a bait box which has a base portion made up of a frame 23 of rectangular shape and having a mesh filler 24. This frame can be slipped into the retainer shown in Figure 5 with the lugs 21 engaged over the side portions thereof. Thus the bait box is held firmly against the bottom 8.

Numeral 25 denotes a foraminous hood which is swingably connected to the mesh filler 24 by rings 26. A hook 27 can be used for hooking the free end of the hood 25 to the mesh filler base 24 of the bait box.

Obviously, the bait box can be readily removed through the back of the trap and filled with various bait. For instance, certain live bait can be kept throughout the season and used in traps over and over again.

The rear end of the trap is provided with a door 28 hingedly connected to the base or bottom 8 by hinges 29. A ring 30 is attached to the middle portion of this door 28. Numeral 31 denotes a spring catch at the free edge of the door 28 which is engageable over a keeper 32 on the top 6. Obviously, when the trap is to be carried from place to place, even with a captured creature therein, the trap may be carried by the ring 30.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a trap structure, an enclosure, an entrance for the enclosure, a door frame jamb inclining from its lower end forwardly of the trap and being located at the entrance, a door hingedly supported at the upper portion of the door frame and adapted to gravitate to a position snugly against the inclined jamb, and a gravitable keeper on the jamb adapted to be set against the door to hold the door slightly ajar to entice animals to enter the enclosure.

2. A trap comprising an entrance, top, bottom, side and back walls, a frame mounted above the bottom wall and some distance inwardly from the entrance, said frame including side and bottom walls, a door swingably mounted in the frame, said side walls of the frame being substantially wide in a direction extending from the entrance toward the back wall to shield the side edges of the door against forces exerted inwardly from the direction of the side walls, said frame extending downwardly on a slant toward the back wall, a jamb at the front portion of the frame against which the door remains by gravity, and a ramp extending inwardly from the entrance to the bottom wall of the frame, said frame having its side walls in spaced relation to the side walls of the trap proper.

FREDERICK SCHREYER.